UNITED STATES PATENT OFFICE.

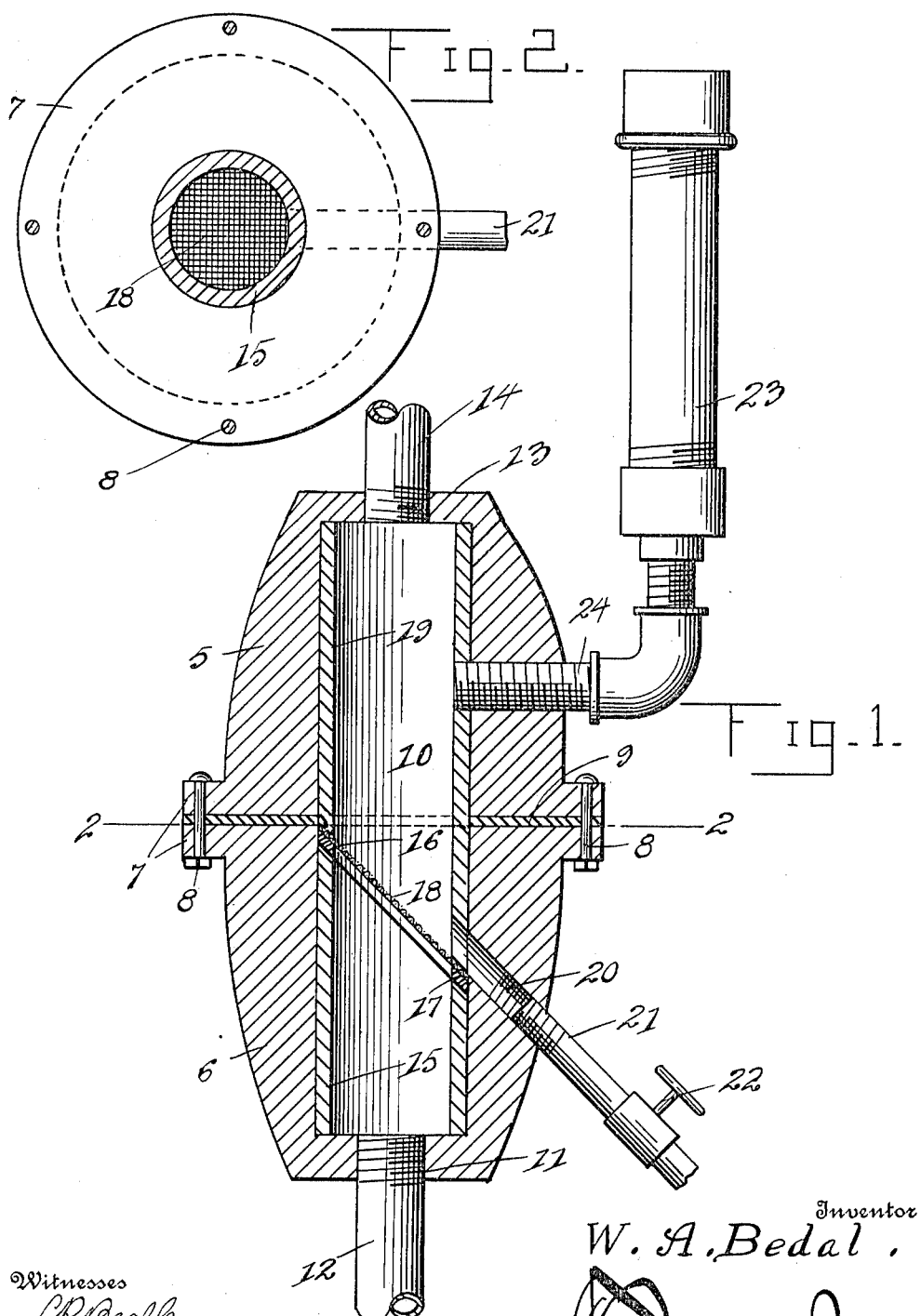

WILLIAM A. BEDAL, OF PORT HURON, MICHIGAN.

WATER-STRAINER.

1,072,299.

Specification of Letters Patent. Patented Sept. 2, 1913.

Application filed June 9, 1913. Serial No. 772,632.

*To all whom it may concern:*

Be it known that I, WILLIAM A. BEDAL, a citizen of the United States, residing at Port Huron, in the county of St. Clair and State of Michigan, have invented certain new and useful Improvements in Water-Strainers; and I do hereby declare the following to be a full, clear, and exact description of the invention, such as will enable others skilled in the art to which it appertains to make and use the same.

This invention comprehends improvements in water strainers and relates more particularly to those which are formed in sections so as to permit of the ready removal and insertion of the strainer, and which are provided with an air chamber so as to regulate the pressure within the strainer and cause a steady flow therethrough.

One of the objects of the invention is to provide a very simply constructed strainer having a casing formed in sections, an inclined screen positioned within said casing, and a drain passage opening into the casing directly above the screen.

The invention also aims to provide a strainer which shall be very efficient, practical and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a vertical longitudinal sectional view with parts of the device shown in elevation, and, Fig. 2 is a section taken on the plane of line 2—2 of Fig. 1.

In the preferred embodiment of my invention I provide a casing having an upper section 5 and a lower section 6, the sections being provided at their opposed ends with laterally projecting flanges 7 which are connected by the bolts 8. To prevent leakage, I place a rubber gasket 9 between the opposed ends of the casing sections. A longitudinal channel or bore 10 extends through the casing and is contracted at its lower end, as clearly shown in the drawings, so as to leave a small discharge opening 11 in which is threaded a discharge pipe 12.

A wall 13 closes the upper end of the bore and carries an intake pipe which discharges into the casing. A cylindrical lining 15 is placed within the bore of the lower section 6 and is cut away so as to form an inclined shoulder 16 upon which is placed a rubber gasket 17 and above the gasket a fine, preferably copper, screen 18. A lining 19 is placed within the bore of the upper section 5 and projects beyond the lower end thereof into the lower section 6 and has its lower extremity inclined so as to coöperate with the upper end of the lining 15 and hold the screen and gasket in position. A drain passage 20 extends through the section 6 at an angle to the horizontal plane and opens upon the passage 10 directly above the lower end of the screen 18. The center line of the drain passage is parallel with the screen 18, as clearly shown in Fig. 1. A drain pipe 21 is fitted into the drain passage 20 and is closed at its lower end by a valve 22.

In order to cause a steady flow of water through the strainer, I provide an air chamber 23 which is connected to a pipe 24 which extends through the upper section 5 and opens upon the passage 10. Should the water be forced into the casing section 5 in spurts, the air chamber will take up the excess pressure and act so as to cause a steady flow through the discharge pipe 12. When a quantity of foreign matter has collected upon the screen 18 it may be removed by opening the valve 22 so as to allow said foreign matter to be washed through the passage 20 and drain pipe 21.

It is to be understood that while I have shown and described the preferred embodiment of my invention, I do not wish to be limited to this exact construction, combination, and arrangement of parts, but may make such changes as will fall within the spirit and scope of the invention as defined by the appended claim.

Having thus described my invention, I claim:—

A water strainer comprising a casing formed by an upper section and a lower section, means for securing said sections together, an inlet pipe communicating with the interior of the casing through the top thereof, a discharge pipe connected to the bottom of the casing, a lining fitted within the lower section and having its upper end inclined to a horizontal plane so as to form a supporting shoulder, a gasket bearing against said shoulder, a screen supported by the gasket, a lining fitted within the upper section and projecting into the lower section, the lower end of said last mentioned lining being parallel to the upper end of the first mentioned lining and engaging the screen so as to lock it in position, the lower section being formed with a discharge passage extending upwardly and inwardly and opening upon the interior of the casing directly above the lower end of the screen, means for controlling the flow of material through the discharge passage, and an air chamber in communication with the upper end of the casing.

In testimony whereof I affix my signature in presence of two witnesses.

WILLIAM A. BEDAL.

Witnesses:
J. A. McMartin,
Stephen S. Hanson.

Copies of this patent may be obtained for five cents each, by addressing the "Commissioner of Patents, Washington, D. C."